United States Patent
Ludlow-Palafox et al.

(10) Patent No.: US 7,951,270 B2
(45) Date of Patent: May 31, 2011

(54) MICROWAVE INDUCED PYROLYSIS REACTOR AND METHOD

(75) Inventors: Carlos Ludlow-Palafox, Cambridgeshire (GB); Howard A. Chase, Cambridgeshire (GB)

(73) Assignee: Cambridge University Technical Services Limited, Cambridge (GB)

( * ) Notice: Subject to any disclaimer, the term of this patent is extended or adjusted under 35 U.S.C. 154(b) by 1164 days.

(21) Appl. No.: 10/583,987

(22) PCT Filed: Dec. 22, 2004

(86) PCT No.: PCT/GB2004/050043
§ 371 (c)(1),
(2), (4) Date: Jan. 23, 2007

(87) PCT Pub. No.: WO2005/061098
PCT Pub. Date: Jul. 7, 2005

(65) Prior Publication Data
US 2008/0099325 A1    May 1, 2008

(30) Foreign Application Priority Data
Dec. 22, 2003    (GB) .................................... 0329556.5

(51) Int. Cl.
*B01J 19/12*    (2006.01)
*C10B 19/00*    (2006.01)

(52) U.S. Cl. ................. 201/13; 201/19; 201/21; 201/33; 585/241; 422/186; 422/187; 202/96; 202/265; 202/270

(58) Field of Classification Search ................. 201/13, 201/19, 21, 33; 202/96, 265, 270; 422/186, 422/187; 204/155, 157.15, 157.43; 585/241
See application file for complete search history.

(56) References Cited

U.S. PATENT DOCUMENTS

| | | | | |
|---|---|---|---|---|
| 5,084,140 A * | 1/1992 | Holland | ......................... | 201/19 |
| 5,824,193 A * | 10/1998 | Edwards | ......................... | 201/7 |
| 6,187,988 B1 * | 2/2001 | Cha | ......................... | 210/748.07 |
| 6,830,662 B2 * | 12/2004 | Cha | ......................... | 204/157.15 |

(Continued)

FOREIGN PATENT DOCUMENTS

| EP | 0 780 457 | * | 6/1997 |
|---|---|---|---|
| GB | 2420542 | * | 5/2006 |

OTHER PUBLICATIONS

Ludlow-palafox et al. Microwave-Induced Pyrolysis of Plastic Wastes. Ind. Eng. Chemic Res 2001, 40, 4749-4756.*

(Continued)

*Primary Examiner* — N. Bhat
(74) *Attorney, Agent, or Firm* — Dickstein Shapiro LLP

(57) ABSTRACT

Recycling a metal/organic laminate continuously involves providing a reactor having a first chamber with a first rotary stirrer, a second chamber with a second rotary stirrer, each chamber containing particulate microwave absorbing material, introducing laminate and additional absorbing material into the first chamber under a reducing or inert atmosphere, stirring and applying microwave energy sufficiently to pyrolyze organic material, transferring a portion of the mixture to the second chamber where it is stirred and microwave energy applied to pyrolyze remaining organic material, delaminate or delaminated metal migrating toward and floating on the upper surface of the mixture, where the second stirrer rotates in a horizontal plane and fluidizes the mixture to give the upper surface of the mixture a radial profile biasing metal floating to migrate radially outwardly, and recovering metal from an exit.

31 Claims, 3 Drawing Sheets

U.S. PATENT DOCUMENTS 7,303,684 B2 * 12/2007 Cha .............................. 210/694
7,361,303 B2 *  4/2008 Kantor et al. .................. 422/22

OTHER PUBLICATIONS

Ludlow-Palafox C. et. al.: "Microwave-induced pyrolysis of plastic wastes" Industrial and Engineering Chemistry Research, vol. 40, No. 22, Oct. 31, 2001, pp. 4749-4756, XP002322045.

Howard A. Chase and Carlos Ludlow-Palafox: "Microwave Pyrolysis of plastic and laminates" Online! 2001, XP002322046 Retrieved from the Internet: URL:http://www.Cheng.cam.ac.uk/research/groups/biochem/Posters/Carlos%20Poster%20June%20202001.pdf> 'retrieved on Mar. 22, 2005!

* cited by examiner

MICROWAVE INDUCED PYROLYSIS REACTOR AND METHOD

This is a 371 of PCT/GB04/50043, filed Dec. 22, 2004.

This invention relates to a reactor and method for recycling laminates of metal and organic material, by pyrolysis of the organic material in a continuous process.

Aluminum/polymer laminates, formed of one or more layers of aluminium foil and one or more layers of organic material, e.g. plastic or paper, are commonly used as packaging or container materials, for example as cartons, cans or tubes for beverages, foodstuffs and other products such as toothpaste, or as blister packaging for medicines. Despite certain efforts to recycle laminates of this type, most usually end up as waste in landfill sites, and there remains a need for a more practical and cost-effective large scale method for recycling these types of materials.

Bench scale trials reported by the present inventors suggest that microwave-induced pyrolysis has potential as an approach to recycling of aluminium/polymer laminates. According to this approach, a bed of carbon as microwave absorbing material is heated using microwave energy in a reactor chamber, and the reactor is purged with nitrogen gas. At a temperature of typically 500 to 600° C., laminate is dropped into and mixed with the carbon bed. With continued microwave irradiation of the carbon bed, the organic content of the laminate is heated by conduction and pyrolyses to gaseous fraction that can be recovered by condensation to form an oily or waxy hydrocarbon product, together with a non-condensable gaseous fraction. The aluminium liberated from the laminate can be separated from the carbon bed by coarse sieving, and thus recovered as a solid.

However, there remains a need for an economically viable method and reactor for continuously recycling aluminium/polymer and other metal/polymer laminates that is operable on a commercial scale. The present invention addresses the need for a method and reactor that meets these requirements.

Accordingly, in a first aspect, the present invention provides a continuous method of recycling a metal/organic laminate comprising a metal laminated with an organic material, the method comprising:

providing a reactor comprising a first chamber containing a first bed of particulate microwave absorbing material and a first rotary stirrer, and a second chamber containing a second bed of particulate microwave absorbing material and a second rotary stirrer, the second chamber having an exit from the reactor;

introducing laminate and additional particulate microwave absorbing material into the first chamber containing the first bed of particulate microwave absorbing material;

stirring the particulate microwave absorbing material and laminate in the first chamber using the first rotary stirrer and applying microwave energy to the mixture of particulate microwave absorbing material and laminate in the first chamber to heat the particulate microwave absorbing material in the mixture to a temperature sufficient to pyrolyse organic material in the laminate;

transferring a portion of the mixture in the first chamber to the second chamber containing the second bed of particulate microwave absorbing material;

stirring the mixture in the second chamber using the second rotary stirrer and applying microwave energy to the mixture in the second chamber to heat the particulate microwave absorbing material in the mixture to a temperature sufficient to pyrolyse organic material remaining in the laminate, whereby laminate or delaminated metal migrates towards and floats on the upper surface of the mixture in the second chamber, said second rotary stirrer rotating in a horizontal plane and being so configured as to fluidise the mixture such that the upper surface of the fluidised mixture has a radial profile that biases laminate or delaminated metal floating on the fluidised mixture to migrate radially outwards;

transferring a portion of the mixture in the second chamber to the exit from the reactor; and recovering metal from the exit from the reactor.

In a second aspect, the invention provides a reactor for recycling a metal/organic laminate comprising metal laminated with an organic material, comprising:

a first chamber containing a first bed of particulate microwave absorbing material and a first rotary stirrer;

a second chamber containing a second bed of particulate microwave absorbing material and a second rotary stirrer, the second chamber having an exit from the reactor; means for introducing laminate and additional particulate microwave absorbing material into the first chamber containing the first bed of particulate microwave absorbing material;

means for transferring a portion of the mixture in the first chamber to the second chamber containing the second bed of particulate microwave absorbing material; means for applying microwave energy to the mixture of particulate microwave absorbing material and laminate in the first and second chambers to heat the particulate microwave absorbing material in the mixture to a temperature sufficient to pyrolyse organic material in the laminate;

means for transferring a portion of the mixture in the second chamber to the exit from the reactor; and means for recovering metal from the exit from the reactor, wherein said second rotary stirrer rotates in a horizontal plane and is so configured as to fluidise the mixture such that the upper surface of the fluidised mixture has a radial profile that biases laminate or delaminated metal floating on the fluidised mixture to migrate radially outwards.

By the term 'metal/organic laminate' as referred to herein is meant any laminates that comprise a layer or film of metal laminated wholly or partially to an organic material. The metal may be any metal that has a melting or boiling point higher than the pyrolysis temperature used in the reactor, for example aluminium or iron, preferably aluminium. The organic material may be any polymeric material that is pyrolysable under the temperatures used in the reactor, for example synthetic polymer materials (such as thermosetting or plastics materials), paper or cardboard, or other hydrocarbon-based polymeric material. The laminate may additionally include components that are not metal or pyrolysable organic material, such as glass fibres or inert fillers, for example the laminate may comprises glass fibre reinforced materials such as fibreglass. Thus, the term 'metal/organic laminate' is used herein to include such laminates as are commonly used as packaging for food, drinks and medicines, e.g. for Tetrapak® containers, beverage cans, food tins or pharmaceutical blister packages, or for other consumer products such as toothpaste.

The reactor preferably has only two reaction chambers, which are interconnected so that a portion of the mixture in the first chamber is transferred directly to the second chamber through the action of the rotary stirrers in the first and second chambers. However, if desired, one or more additional, interconnected chambers can be included in the reactor, intermediate the first and second chambers. In the case that one or more additional reactor chambers are included, each additional chamber contains a bed of particulate microwave absorbing material independently stirred by a rotary stirrer. Thus, a portion of the mixture in the first chamber would be transferred to the adjoining additional chamber, and a portion of the mixture in that additional chamber would be transferred to the next additional chamber or, if the next chamber is the second chamber, would be transferred to the second chamber.

The reactor chambers are preferably cylindrical, and coaxial with their respective rotary stirrers rotating about a vertical axis of rotation. If made from a square or rectangular reactor construction, the corners of each chamber are preferably provided with pieces of microwave-transparent material shaped to assist the stirring movement of the bed in order to avoid dead zones.

An inlet feed for the introduction of laminate into the first reactor chamber and an exit from the second reactor chamber are provided for the reactor. Gas inlet and exit pipes for the introduction and removal of gas providing an inert or reducing atmosphere, and of gases generated through pyrolysis of the laminate are also provided for the reactor. The feed and exit pipes preferably can be isolated from the internal reactor conditions by suitable shut-off or valve means, for example using lock-hopper systems or double-flap valves.

The beds in the chambers are formed of particulate microwave absorbing material, i.e. a material that can absorb microwave energy and thus become heated to a temperature that is sufficient to pyrolyse the organic material present in the laminate when the laminate is mixed with the bed of material. The heat of the particulate microwave absorbing material is thus conducted to the laminate through intimate contact with the particles or powder of the microwave absorbing material. Suitable microwave absorbing materials include carbon black, activated carbon, certain metal oxides such as some iron oxide, and certain other compounds such as silicon carbide. Preferred as microwave absorbing materials are carbon black powder and activated carbon powder.

In order to irradiate the beds of microwave absorbing material in the reactor chambers, the reactor has one or more microwave guides disposed around the respective chambers. The microwave guides are preferably isolated from the reactor conditions, for example by a quartz window in the reactor wall, in known manner. Any suitable microwave source and guide arrangement can be used. The application of microwaves to the beds should be controlled so as to ensure that the beds attain and maintain a temperature at which the organic material is pyrolysed. Preferably, microwaves are applied such that the particulate microwave absorbing material in the beds is heated to a temperature in the range from 250 to 700° C., more preferably in the range from 500 to 600° C. If desired, the temperature can be varied over time within these ranges. Each bed within the first, second and any additional chambers can be heated to the same or different temperatures within these ranges.

If desired, auxiliary heating means can be used to preheat the beds of particulate microwave absorbing material, before or after the laminate is introduced into the reactor, for example by combusting fuel inside the reactor, or by electric heating means in the reactor walls. Preferably, microwaves are the sole heating means for the beds.

Before the beds are heated to the pyrolysing temperature, the reactor is purged with an inert or reducing gas, and thereafter the process is carried out under pyrolysing conditions under an inert or reducing atmosphere, in order to prevent or minimise combustion of the organic compounds present in the laminate. Suitable inert or reducing gases include nitrogen, argon, helium, steam or hydrogen. Preferably, the gas used to purge the reactor and maintain an inert or reducing atmosphere is nitrogen gas.

The laminate is fed into the first chamber by appropriate feed means through an inlet into the first chamber, and is stirred into and mixed with the bed of microwave absorbing material through the action of a rotary stirrer in the first chamber. Intimate contact between the particles of microwave absorbing material and the laminate ensures efficient transfer of heat to the organic material over all surfaces. If desired or necessary, the laminate is cut or shredded to an appropriate size according to the size of the equipment, for example to provide laminate pieces having an area in the range from 0.25 to 25 cm$^2$, before entering the reactor. The feed rate of laminate into the reactor is preferably controlled, for example to provide a microwave absorbing material to laminate weight ratio within each chamber in the range from 1:1 to 50:1, preferably in the range from 5:1 to 10:1.

In the continuous process of the invention, additional particulate microwave absorbing material is preferably introduced into the first reactor chamber in order to provide a relative excess of microwave absorbing material in the first chamber compared with the next adjoining chamber, which excess will replenish a corresponding amount of microwave absorbing material exiting the reactor from the second chamber. Thus, after a period of stirring, a portion of the mixture of laminate and microwave absorbing material in the first chamber will flow into and be transferred to the next adjoining chamber. The laminate is preferably introduced together with the additional particulate microwave absorbing material. More preferably, the additional particulate microwave absorbing material is mixed with the laminate before entering the reactor. The additional particulate material introduced into the first reactor chamber preferably has been recycled from the exit from the reactor, after being separated from the metal exiting the reactor. The additional particulate microwave absorbing material or the laminate, or both, can be preheated before entering the reactor, for example using hot air or other suitable heating means.

When the laminate reaches the process temperature, through heat conduction from the particles of microwave absorbing material, pyrolytic reactions occur, whereby polymers and other organic compounds present in the laminate degrade to gaseous compounds. The gaseous compounds, which may include condensable and non-condensable gases, exit the reactor through one or more gas exit pipes, and any condensable oases may be condensed to an oily or waxy condensate for recycling, or may be combusted, with any non-condensable gases present, to generate heat or mechanical work.

Through the action of the rotary stirrers, the beds are fluidised, and the laminate or delaminated metal migrates towards the top surface of the beds due to its relative lower density compared with that of the fluidised bed material. The reactor chambers are interconnected so that the paths of the rotary stirrers overlap to some degree. The overlapping flows of the fluidised beds in adjoining chambers, created by the actions of the respective rotary stirrers through their overlapping paths, causes a portion of the bed in one chamber to be transferred to the bed in the next chamber, for example from the first chamber to the second chamber in a two-chamber reactor. Thus, over time, the laminate introduced into the first chamber is transferred through the first and second, and any intermediate, chambers to the exit from the reactor. At the same time, in at least the second (i.e. final) chamber the laminate and delaminated metal migrates towards the top surface of the bed, and may float on top of the bed. The delaminated metal is thus concentrated at the top of the bed in the second chamber, and can be recovered from the reactor in relatively high concentration with respect to the particulate microwave absorbing material. After exiting the reactor, the delaminated metal, preferably aluminium, is separated from the particulate microwave absorbing material that exits with it, and is thus recoverable in substantially pure form as metal pieces or foil. The metal can be separated from the exited particulate microwave absorbing material using suitable separation techniques, preferably by sieving. The particulate microwave absorbing material separated from the metal is preferably recycled to the first reactor chamber, optionally after subjecting to preheating or mixing with unprocessed laminate, or both.

Since the delaminated metal in the second chamber is concentrated at the top of the bed, preferably the exit from the reactor is through a sidewall of the second chamber, and the exit has a bottom surface disposed at a height at or close to the level of the top of the bed in said chamber, such that the metal, and optionally a portion of the particulate microwave absorbing material, exits when its level exceeds the height of said bottom surface.

The rotary stirrers in the reactor chambers preferably rotate in the same rotation direction, and at the same rotary frequency. Preferably, the stirrers rotate at a rate in the range from 2 to 60 revolutions per minute (rpm), for example 5 to 20 rpm.

The rotary stirrers in each respective chamber may have mutually different configurations. For example, the stirrer in the first chamber is preferably configured to thoroughly mix the introduced laminate with the particles of the first bed. The stirrer of the second chamber is preferably configured to fluidize the second bed in such a way that the delaminated metal tends to migrate upwards towards the top of the bed.

Preferably the rotary stirrer in the first chamber is configured as a horizontally extending blade rotating about a vertical axis, in which the upper edge or upper surface of the blade is horizontal so that the peripheral part of the blade is at the same level as the axial part. The blade may be single arm (i.e. with the axial part at one extremity of the blade and the peripheral part at the other extremity of the blade) or may be double arm (i.e. with the axial part at the midpoint of the blade and peripheral parts at the extremities of the blade), and is preferably double arm.

Preferably the rotary stirrer in the second chamber is configured as a horizontally extending blade rotating about a vertical axis, the upper edge or upper surface of the blade sloping down from the axial part of the blade, which is preferably at the midpoint of the blade, towards the peripheral part of the blade, so that the upper edge or surface of the peripheral part of the blade is at a lower level than the axial part. The blade may be single arm or may be double arm, and preferably is double arm. For example, the rotary stirrer in the second chamber may be configured as a trapezoidal or triangular blade, preferably a trapezoidal blade, rotating about its midpoint.

Since the rotary stirrers of adjacent reactor chambers describe overlapping pathways, particulate microwave absorbing material and laminate swept by the blade of the rotary stirrer of the first chamber into the overlapping path of the rotary stirrer of the second (or intermediate) chamber will be swept out of the portion of overlap by the next sweep of the blade of the rotary stirrer of the second (or intermediate) chamber. It will be appreciated that the respective blades of adjacent reactor chambers must not be aligned, so as to prevent collision. Preferably, the blades of the rotary stirrers of adjacent chambers are misaligned by an angle of 90 degrees.

The invention will be further illustrated by the drawings and their description, in which.

Figure 1:
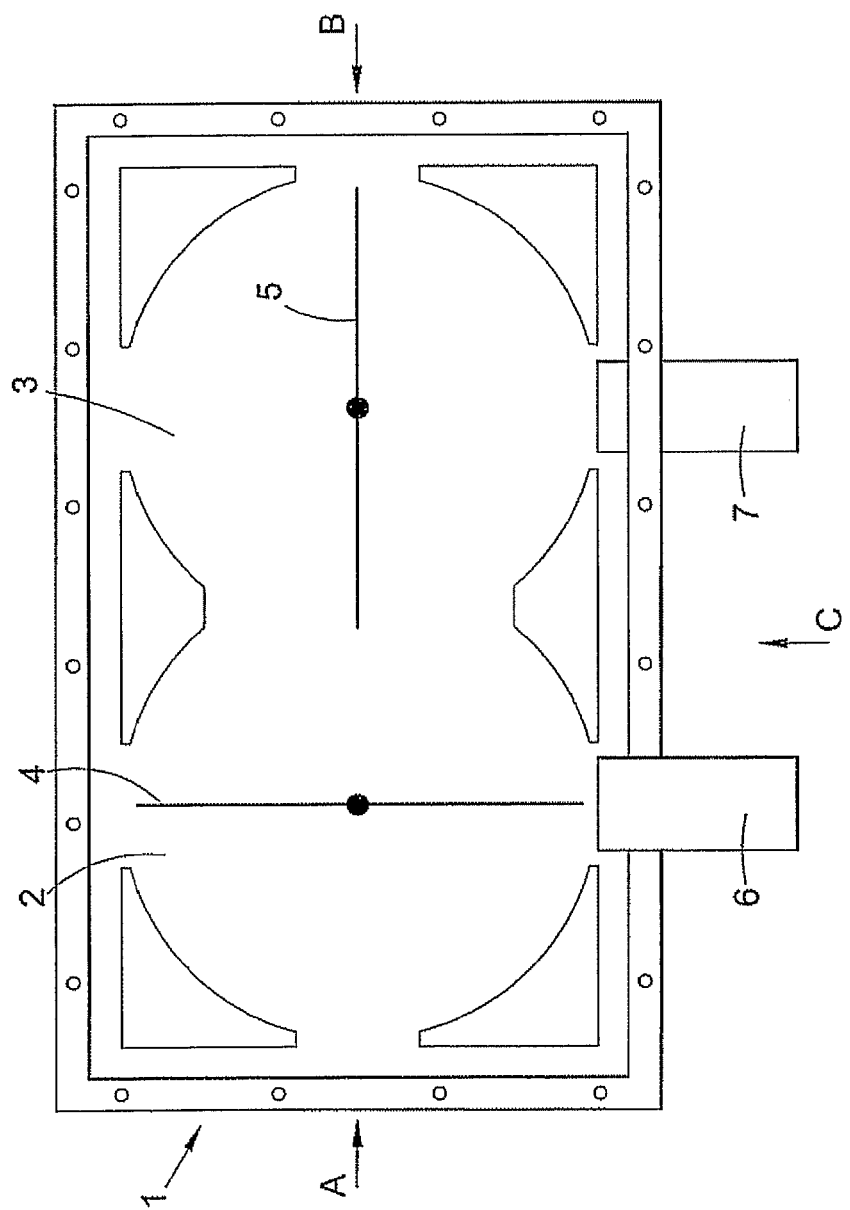
FIG. 1 represents a plan view of the interior of a reactor according to an embodiment of the invention.
Figure 2:
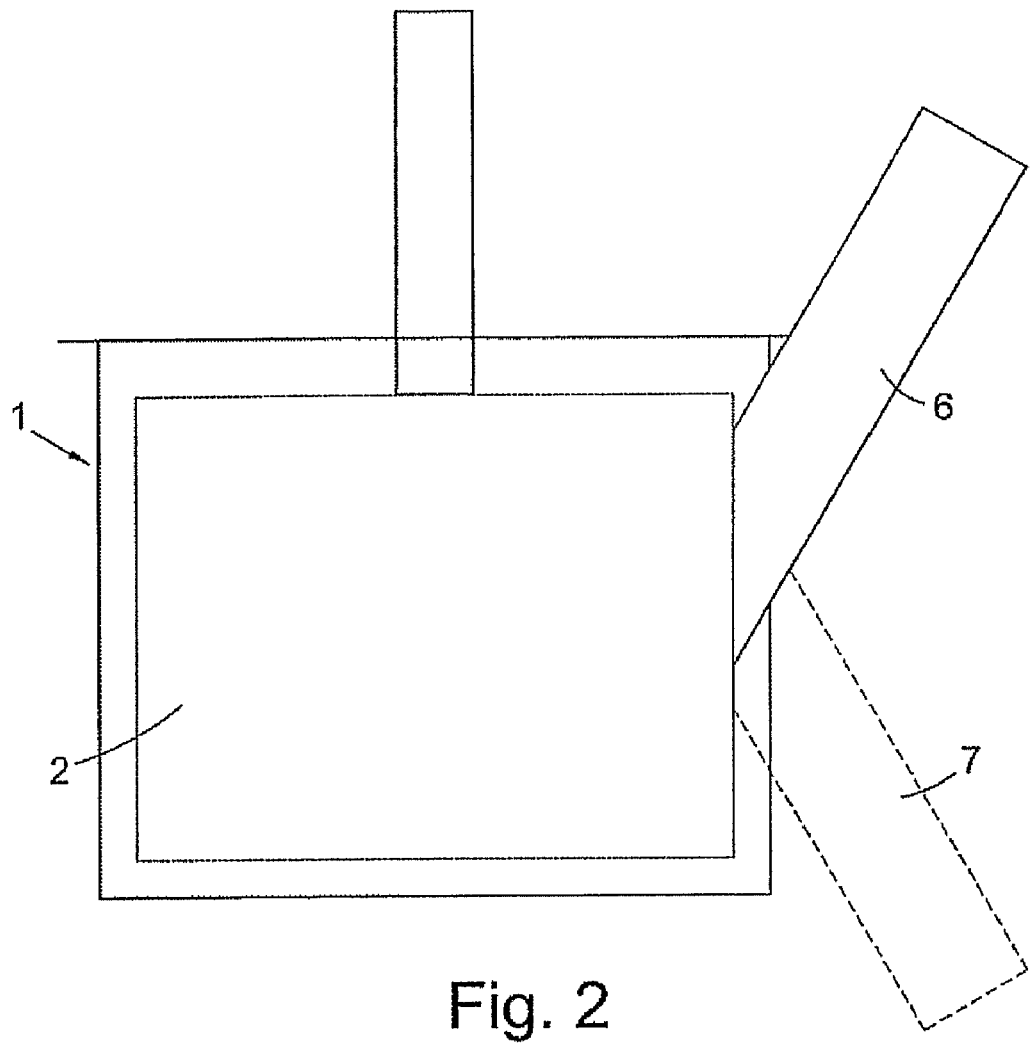
FIG. 2 represents a side view of the reactor of FIG. 1 when viewed from side A.
Figure 3:
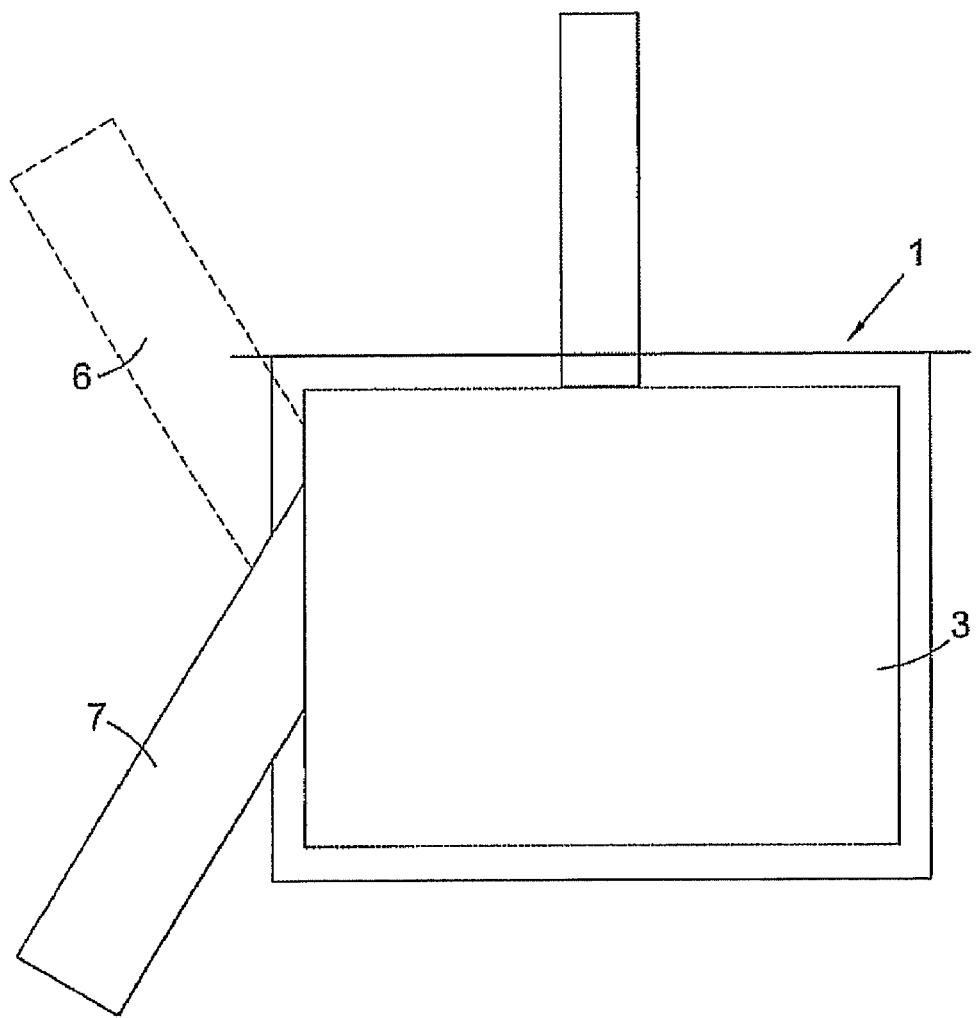
FIG. 3 represents a side view of the reactor of FIG. 1 when viewed from side B.

In FIGS. 1 to 3, reactor 1 has a first cylindrical chamber 2 containing a first bed of carbon black powder and a second cylindrical chamber 3 containing a second bed of carbon black powder. Chambers 2 and 3 are adjoining and interconnected, and contain rotary stirrers 4 and 5, respectively. Stirrers 4 and 5 rotate though overlapping paths. A nitrogen purge is passed through the reactor 1 and maintained as reducing atmosphere (nitrogen inlet and outlet pipes not shown). Microwave energy is introduced into chambers 2 and 3 (guides not shown) to heat first and second beds to pyrolysing temperature. Gaseous pyrolysis products exit the reactor (pipes not shown) Laminate and additional carbon black powder is introduced by inlet 6 into chamber 2 and mixed into the first bed through the action of stirrer 4. A portion of the mixture passes into the second bed in chamber 3. Delaminated aluminium exits reactor 1 through exit 7 from chamber 3 together with some carbon black powder, and is separated from the exited carbon black powder. The separated carbon black powder is recycled to inlet 6.

The invention may be further illustrated by reference to the following non-limiting example:

EXPERIMENTAL METHOD

A reactor, for example a two-chamber reactor as shout in FIGS. 1 to 3, is operated continuously as follows:

In the reactor, all of the chambers present (preferably two) are filled with particulate microwave absorbent material (preferably carbon) up to the level of the exit in the last chamber Once the chambers have been filled with the microwave absorbent, the motor or motors that drive the rotary stirrers in all the chambers are switched on.

The system is checked to ensure that all the connections are in place and that the equipment is sealed. At this stage, a small flow of nitrogen or other inert gas is allowed to flow through the reactor in order to purge out the oxygen from within the reaction chambers.

The microwave sources (magnetrons) are switched on. The microwave absorbent material starts to heat up due to the action of the microwaves. The temperature of the microwave absorbent is continuously monitored, and preferably input to a computer running a control program, connected to the magnetrons so as to control the heating rate and the temperature of the microwave absorbent inside the reactor.

Once a desired reaction temperature has been reached, the laminate is fed to the first reaction chamber through the feed pipe. Alternatively, some laminate materials could have been fed to the reactor before the desired temperature had been achieved. Preferably) the laminate would have previously been cut into pieces of appropriate size according to the size of the equipment, for example so that the size of the pieces of laminate entering the reactor is 0.25-25 $cm^2$. The laminate is fed using double gate valves, combinations of pistons and screw conveyors or any other similar means in order to maintain the interior of the reaction chambers free of oxygen. The microwave absorbent to laminate ratio within each chamber can vary between 1:1 and 50:1, preferably the ratio is 5:1 to 10:1, by weight.

The laminate start to pyrolyse and gases exit from the reactor through pipes connected to the reactor. The gases can be condensed and/or collected for their subsequent use. Alternatively the gases could be burnt immediately to produce either heat or electricity by appropriate means. The laminate, or clean aluminum once pyrolysis has been achieved, migrates from the first to any subsequent chamber and finds its way to the exit. The clean aluminium leaves the reactor via a double gate valve, a combination of a pistons and screw conveyors or any other similar means that prevents oxygen from entering the reactor. As clean aluminum continuously exits from the final chamber, fresh laminate is added to the first chamber along with any additional microwave absorbent needed to "top-up" the reactor.

The invention claimed is:

1. A continuous method of recycling a metal/organic laminate comprising metal laminated with an organic material, the method comprising:
   providing a reactor comprising a first chamber containing a first bed of particulate microwave absorbing material and a first rotary stirrer, and a second chamber containing a second bed of particulate microwave absorbing material and a second rotary stirrer, the second chamber having an exit from the reactor;
   introducing laminate and additional particulate microwave absorbing material into the first chamber containing the first bed of particulate microwave absorbing material;
   stirring the particulate microwave absorbing material and laminate in the first chamber using the first rotary stirrer and applying microwave energy to the mixture of particulate microwave absorbing material and laminate in the first chamber to heat the particulate microwave absorbing material in the mixture to a temperature sufficient to pyrolyse organic material in the laminate;
   transferring a portion of the mixture in the first chamber to the second chamber containing the second bed of particulate microwave absorbing material;
   stirring the mixture in the second chamber using the second rotary stirrer and applying microwave energy to the mixture in the second chamber to heat the particulate microwave absorbing material in the mixture to a temperature sufficient to pyrolyse organic material remaining in the laminate, whereby laminate or delaminated metal migrates towards and floats on the upper surface of the mixture in the second chamber, wherein at least the rotary stirrer in the second chamber is configured as a horizontally extending blade rotating about a vertical axis at its midpoint, the upper edge or upper surface of the blade sloping down from said midpoint towards the extremities of the blade to fluidise the mixture such that the upper surface of the fluidised mixture has a radial profile that biases laminate or delaminated metal floating on the fluidised mixture to migrate radially outwards;
   transferring a portion of the mixture in the second chamber to the exit from the reactor; and
   recovering metal from the exit from the reactor.

2. A method according to claim 1 wherein the transfer of the portion of the mixture in the first chamber to the second chamber is via one or more intermediate chambers each containing a bed of particulate microwave absorbing material stirred by a rotary stirrer.

3. A method according to claim 1 wherein the reactor consists of two reaction chambers.

4. A method according to claim 1 further comprising recovering pyrolysed products from the reactor.

5. A method according to claim 1 wherein the organic material comprises plastic or paper material, or both.

6. A method according to claim 1 wherein the particulate microwave absorbing material is heated to a temperature in the range from 500 to 600° C.

7. A method according to claim 1 wherein the particulate microwave absorbing material is carbon black powder.

8. A method according to claim 1 further comprising providing an inert or reducing atmosphere in the reactor.

9. A method according to claim 8 wherein the atmosphere is nitrogen gas.

10. A method according to claim 1 wherein the additional particulate microwave absorbing material is mixed with the laminate before entering the reactor.

11. A method according to claim 1 wherein the additional particulate microwave absorbing material or the laminate, or both, is preheated before entering the reactor.

12. A method according to claim 1 wherein particulate microwave absorbing material is preheated in the reactor before mixing with the laminate.

13. A method according to claim 1 wherein the action of the stirrer in the first chamber transfers particulate microwave absorbing material from the first chamber to the next chamber.

14. A method according to any preceding claim 1 wherein a portion of the particulate microwave absorbing material in the second chamber exits from the reactor with the metal.

15. A method according to claim 14 further comprising separating the exited particulate microwave absorbing material from the exited metal, and recycling the separated particulate microwave absorbing material to the reactor.

16. A method according to claim 1 wherein the rotary stirrers describe overlapping paths whereby the action of the rotary stirrers transfers a portion of the particulate microwave absorbing material from the first chamber to the next chamber.

17. A method according to claim 1 wherein the exit is through a sidewall of the second chamber, and has a bottom surface disposed at a height at or close to the level of the top of the bed in said chamber, such that the metal, and optionally a portion of the particulate microwave absorbing material, exits when its level exceeds the height of said bottom surface.

18. A method according to claim 1 wherein at least the rotary stirrer in the second chamber is configured as a trapezoidal blade rotating about its midpoint.

19. A method according to claim 1 wherein the metal/organic laminate comprises aluminium laminated with an organic material.

20. A reactor for recycling a metal/organic laminate comprising metal laminated with an organic material, comprising:
   a first chamber containing a first bed of particulate microwave absorbing material and a first rotary stirrer;
   a second chamber containing a second bed of particulate microwave absorbing material and a second rotary stirrer, the second chamber having an exit from the reactor;
   means for introducing laminate and additional particulate microwave absorbing material into the first chamber containing the first bed of particulate microwave absorbing material;
   means for transferring a portion of the mixture in the first chamber to the second chamber containing the second bed of particulate microwave absorbing material;
   means for applying microwave energy to the mixture of particulate microwave absorbing material and laminate in the first and second chambers to heat the particulate microwave absorbing material in the mixture to a temperature sufficient to pyrolyse organic material in the laminate;
   means for transferring a portion of the mixture in the second chamber to the exit from the reactor; and
   means for recovering metal from the exit from the reactor, wherein at least the rotary stirrer in the second chamber is configured as a horizontally extending blade rotating about a vertical axis at its midpoint, the upper edge or upper surface of the blade sloping down from said midpoint towards the extremities of the blade to fluidise the mixture such that the upper surface of the fluidised mixture has a radial profile that biases laminate or delaminated metal floating on the fluidised mixture to migrate radially outwards.

21. A reactor according to claim 20 further comprising one or more chambers intermediate the first and second chambers, each containing a bed of particulate microwave absorbing material stirred by a rotary stirrer.

22. A reactor according to claim 20 consisting of two reaction chambers.

23. A reactor according to claim 20 wherein the particulate microwave absorbing material is carbon black powder or activated carbon powder.

24. A reactor according to claim 20 further comprising an inert or reducing atmosphere in the reactor.

25. A reactor according to claim 24 wherein the atmosphere is nitrogen gas.

26. A reactor according to claim 20 wherein the stirrer in the first chamber transfers a portion of the mixture in the first chamber to the next chamber.

27. A reactor according to claim 20 further comprising means for separating the exited particulate microwave absorbing material from the exited metal, and for recycling the separated particulate microwave absorbing material to the reactor.

28. A reactor according to claim 20 wherein the rotary stirrers describe overlapping paths whereby the action of the rotary stirrers transfers a portion of the particulate microwave absorbing material from the first chamber to the next chamber.

29. A reactor according to claim 20 wherein the exit is through a sidewall of the second chamber, and has a bottom surface disposed at a height at or close to the level of the top of the bed in said chamber, such that the metal, and optionally a portion of the particulate microwave absorbing material, exits when its level exceeds the height of said bottom surface.

30. A reactor according to claim 20 wherein at least the rotary stirrer in the second chamber is configured as a trapezoidal blade rotating about its midpoint.

31. A reactor according to claim 20 wherein the metal/organic laminate comprises aluminium laminated with an organic material.

* * * * *